March 5, 1963    D. CHARRIN    3,079,861
PERFORATING SHAPED CHARGES
Filed May 6, 1959
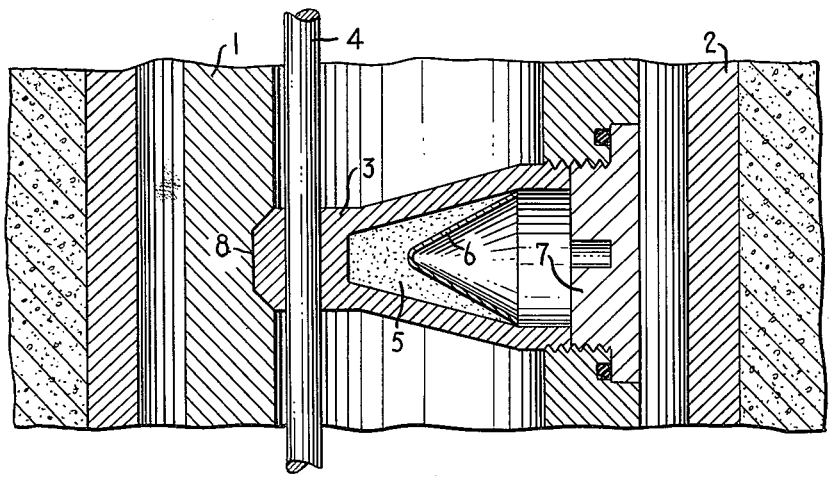
INVENTOR.
DENIS CHARRIN
BY
Brumbaugh, Free, Graves & Donohue
his    ATTORNEYS

3,079,861
PERFORATING SHAPED CHARGES

Denis Charrin, Paris, France, assignor to Societe de Prospection Electrique, Procedes Schlumberger, Paris, France, a corporation of France
Filed May 6, 1959, Ser. No. 811,269
Claims priority, application France Nov. 13, 1958
3 Claims. (Cl. 102—24)

In the U.S. patent application Serial No. 704,936, filed on December 24, 1957, in the name of Jacques Delacour for "Shaped Explosive Charge Apparatus," there is described a perforating hollow charge adapted for use in particular for the perforation of the pipes lining the inner wall of bore holes, together with the concrete mass filling the ground outside said pipes and the geological layers behind said concrete mass.

These prior shaped charges referred to are characterized by a metal casing produced starting from compressed and possibly sintered metallic powders. The casings thus formed are completely atomized under the action of the explosion of the charge, so as to form a powder the granulometric properties of which are equivalent to those of the original metal powder, which cuts out any risk of clogging up the perforations produced by the blast, which may occur in the case of casings made of solid metal. Furthermore, said casings made of sintered metal powder provide excellent gas-confining effects.

The present invention has for its object to still further improve the gas-confining properties of the charge casing, while retaining the advantageous results obtained by the atomization of the casing through the explosion.

To this end, the invention consists in resorting to casings made of an agglomerated, possibly sintered metal powder with which are incorporated substances adapted to fill at least partly the pores of the agglomerated material. It is possible, to this end, to resort either to liquids such as oil, or else to substances the melting point of which is lower than that of the agglomerated powder. It is also possible to introduce explosive substances so as to obtain active casings by filtering a suspension of active solids through a casing of sintered or agglomerated metal particles to trap the active solids in the pores of the casing. Furthermore, in the case of agglomerates of pulverulent iron or steel, it is possible to use, as substances to be introduced through a similar filtering process, preferably heavy metals such as copper or zinc.

Generally speaking, the injection or introduction through filtering in the above manner may be executed in accordance with conventional techniques as applied generally to the injection of solid material into agglomerated substances. In the first case, referred to hereinabove, which is that of liquids, the latter may be introduced through mere capillarity at room temperature.

In the second case and in particular for the production of casings made of agglomerated steel particles into which copper for instance is to be injected, it is generally sufficient to melt the copper inside the casings made of agglomerated and sintered iron particles, the amount of which copper is higher than the amount required for filling all the interstices of the agglomerated casing, the copper entering through capillarity into all the pores remaining in the mass and the excess copper separating readily from the remainder thereof.

It is also possible to obtain a partial filling of the interstices through the use of compressed powders having different melting points and sintering same with a liquid phase.

Lastly, a compound method consists in filling the interstices through a combination of the two above-mentioned techniques.

As a matter of fact, these different methods are presently used on a large scale in the metallurgical treatment of pulverulent metals with a view to obtaining parts having a high specific weight and a high mechanical resistance.

In a typical example, sintered iron articles having a specific weight equal to 6.5 are raised to a specific weight of 8 by an introduction of copper into the articles through filtering.

Further objects and advantages of the invention will be apparent from the following description taken in conjunction with the accompanying drawing which is a view in longitudinal cross-section of a typical shaped charge device embodying the invention.

In the drawing, the shaped charge device is generally of the type described in connection with FIG. 2 of the above-identified application of Delacour, No. 704,936.

As shown in the drawing, the shaped charge device of the invention, in practice, is mounted within a tubular housing 1 and lowered into a well borehole which may be lined with a metal pipe 2. The device comprises a generally cylindrical casing 3, closed at one end 8 which is supported in one wall of the tubular housing 1, and covered at the opposite end by a cap 7 which is mounted in an opening in the opposite wall of the housing. Within the casing 3, a shaped explosive charge 5 having a cavity liner 6 is positioned so that the jet formed by detonation of the charge is directed through the cap 7 toward the pipe 2 to perforate it, a conventional charge-igniting device 4 being received in the closed end of the casing.

In accordance with the invention, the casing 3 for the shaped charge is made of sintered metal incorporating a filling material in the manner described above to increase its specific weight and improve its gas-confining properties. Consequently, when the charge 5 is detonated by the igniting device 4, the resulting explosive gases are initially confined by the casing 3 so as to contain and direct the explosive force in the direction through the cap 7 and into the surrounding formation. After detonation, however, the agglomerated sintered material of the casing 3 becomes pulverized so that no fragments remain which are large enough to block a perforation made by the explosion, the filling material being completely melted or vaporized.

The charge casings obtained according to the invention show, from the standpoint of efficiency of confinement, the following advantages: an excellent mechanical behaviour, a high specific weight, a reduced compressibility and a high inner damping.

Furthermore, when used as casings for shaped charges intended for oil wells, such casings lead to a large improvement in the efficiency of the explosive, while producing when fired waste material which is incapable of clogging the perforations obtained.

Of course many modifications may be brought to the invention defined in the accompanying claims, without unduly widening the scope of the latter.

What I claim is:

1. A shaped charge casing structure comprising casing means having an opening at one end for receiving a shaped charge and for initially confining the gases generated upon detonation of the charge and directing the force of the explosion toward the open end of the casing means, the casing means being formed from a mass of sintered agglomerated metal particles so that it tends to pulverize rather than to break into large pieces upon fragmentation, and filling means incorporated into the mass of sintered material so as to fill at least a portion of the pores, thereby increasing the specific weight of the casing means and contributing to the confinement of gases generated upon detonation of the charge.

2. A shaped charge casing according to claim 1 wherein the filling means comprises oil.

3. A shaped charge casing according to claim 1 wherein the filling means comprises another metal having a lower melting point than that of the metal particles.

References Cited in the file of this patent
UNITED STATES PATENTS

| | | |
|---|---|---|
| 2,299,192 | Tormyn | Oct. 20, 1942 |
| 2,605,703 | Lawson | Aug. 5, 1952 |
| 2,661,238 | Osti et al. | Dec. 1, 1953 |
| 2,667,836 | Church et al. | Feb. 2, 1954 |
| 2,870,709 | Boelter | Jan. 27, 1959 |